April 26, 1966    E. E. REED    3,247,713
FLUID METERING
Filed April 5, 1962

INVENTOR.
E. E. REED
BY
ATTORNEYS

United States Patent Office 3,247,713
Patented Apr. 26, 1966

3,247,713
FLUID METERING
Edwin E. Reed, Bartlesville, Okla., assignor to Phillips Petroleum Company, a corporation of Delaware
Filed Apr. 5, 1962, Ser. No. 185,359
3 Claims. (Cl. 73—199)

This invention relates to metering a flowing stream of fluid. In one aspect the invention relates to a method for controlling the pressure of a flowing stream of fluid being metered to permit accurate temperature and pressure correction of the metered value. In another aspect this invention relates to fluid flow metering means. In another aspect the invention relates to means for controlling the pressure in a fluid meter responsive to the temperature of the metered stream.

A positive displacement meter measures the actual volume of fluid being metered under the conditions existing, whereas usually a more accurate measure of the quantity being transferred is the weight of the material. For many liquids, the variation of volume with change in temperature and pressure is very small and can be ignored without unacceptable error. Other liquids, however, have a large enough volume change to be appreciable and this is true, for example, with propane and butane which are components of commercial liquefied petroleum gas (LPG). Generally speaking, the compressibility of a liquid increases as the liquid approaches its critical temperature and, of course, the correction is more important as the unit price and the volume being metered increase.

LPG often is metered in storage or transport tanks, and when this is done volume corrections can be made from tables which take into account only the temperature of the product since the product is at equilibrium conditions of pressure. That is, the product exists at the vapor pressure at that temperature.

Recently self-service truck loading of petroleum products has been found to be useful in many instances to provide improved service for the distributor of the products and to provide operational economy for the supplier. In such operations it is necessary to meter the product as a flowing stream. It is, of course, desirable to utilize such installations in the delivery of LPG and when this is done the usual type of correction is not completely accurate since the metering pressure always is higher than the vapor pressure.

An object of this invention is to meter a liquid accurately under vary ambient conditions.

Another object of this invention is to control the pressure of a metered liquid to a value which is a constant amount above the vapor pressure at the ambient pressure.

Another object of this invention is to meter liquefied petroleum gas accurately.

Other aspects, objects and the advantages of my invention are apparent in the written description, the drawing and the claims.

According to my invention a fluid stream is metered by passing the stream through a metering zone while maintaining a pressure which is a function of the temperature. This is accomplished by measuring the temperature and pressure of the metered stream, throttling the stream upstream of the metering zone when the pressure exceeds the set point pressure, throttling the stream downstream of the metering zone when the pressure falls below the set point pressure and adjusting the set point pressure responsive to the measured temperature. The pressure set point is continuously adjusted responsive to the temperature to maintain the set point a constant amount in excess of the vapor pressure of the fluid at metering temperature.

Also according to my invention, there are provided flow metering means comprising a meter, throttling means in the inlet to the meter and the outlet from the meter, means to measure the pressure and temperature of the stream being metered, means to throttle the inlet when the pressure exceeds the set point value and to throttle the outlet when the pressure falls below the set point value and to adjust the set point of the pressure control responsive to the measured temperature. This is accomplished by providing motor valves in the inlet and outlet from the meter and utilizing a pressure controller to throttle the inlet motor valve when the pressure exceeds a predetermined value and the outlet motor valve when the pressure falls below a predetermined value and to adjust the set point of the controller responsive to the temperature to maintain the metered pressure a constant amount above the vapor pressure of the fluid being metered.

Figure 1:
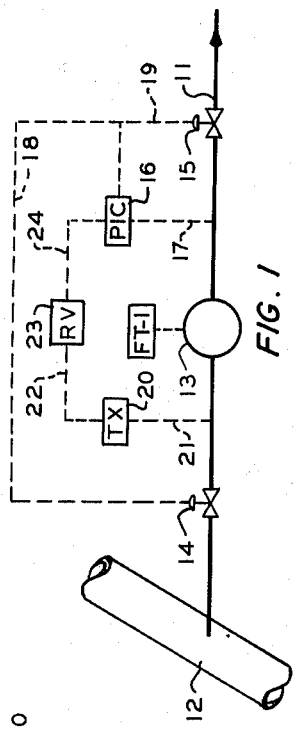
FIG. 1 is a diagrammatic representation of the invention.

In FIG. 1 of the drawing, delivery line 11 is connected with a pipe line 12 and includes a positive displacement meter 13, a motor valve 14 and a motor valve 15. A pressure controller 16 is connected with a pressure-sensing element 17 and the output of controller 16 is connected by conduits 18 and 19 with motor valves 14 and 15, respectively. Pressure controller 16 is of the type having a set point adjustment which can be actuated by an external control signal, as for example, one having a pneumatic set point adjustment. A temperature transmitter 20 is connected with a temperature-sensing element 21 and transmits its signal through conduit 22 which is a function of the temperature in delivery line 11. This signal is modified by a relay 23 to provide a signal in conduit 24 which is a function of the vapor pressure of the fluid being metered. This signal representing vapor pressure is utilized to adjust the set point of controller 16 to maintain a pressure in the delivery line 11 which is a constant amount greater than the vapor pressure at the metering temperature. This permits an accurate correction of the metered volume to a desired standard condition. Meter 13 is a type having an adjustable correction for temperature correction. Such meters are well known and it is unnecessary to describe the meter in detail except to state that the correction involved is of a type amounting to the multiplication of the temperature differential by a constant factor and the addition of this amount, positive or negative, to the metered volume. As noted above, where the compressibility of the liquid is sufficiently small and more particularly when the volume being metered is relatively small and/or the price of the product is small, such a correction is sufficiently accurate for commercial use. However, where the compressibility of the product is appreciable as, for example, in the metering of commercial LPG, this factor should not be ignored. The correction of the volume can be made as follows:

$$V_s = V_a \times \frac{1}{1 + f_t(t_a - t_s)} \times \frac{1}{1 - f_p(P_a - P_s)}$$

$V_s$ = volume at standard conditions
$V_a$ = volume metered at ambient conditions
$f_t$ = coefficient of thermal expansion
$f_p$ = compressibility factor
$P_a$ = pressure at ambient conditions
$P_s$ = pressure at standard conditions
$t_a$ = temperature at ambient conditions
$t_s$ = temperature at standard conditions It is possible to choose suitable values for $f_t$ and $f_p$ which are sufficiently accurate over the range of conditions encountered to provide very accurate measurement. However, such a correction requires relatively complicated computing to arrive at the corrected volume. It has been customary in metering LPG to utilize a factor F which takes into account both temperature and pressure (compressibility) corrections, assuming that the measurements are made under equilibrium conditions. As noted above, LPG often is metered in storage or transportation tanks and thus the system has wide usefulness. However, when the metering is done under pressure in excess of the vapor pressure, the equation, utilizing the factor F which corrects for pressure and temperature both from equilibrium conditions, requires a compressibility factor.

Figure 2:
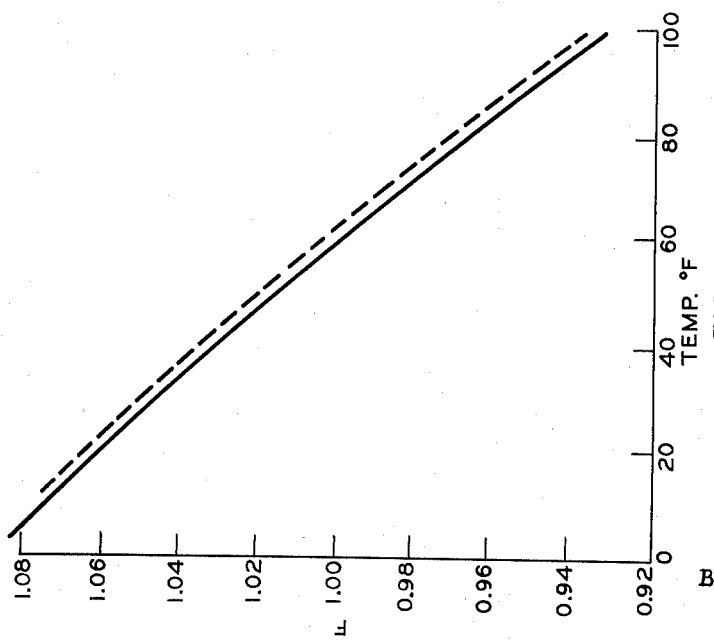
FIG. 2 is a graph plotting temperature versus the correction factor F customarily used in metering LPG.

The values for F (plotted against temperature in the normal range of ambient temperatures encountered in LPG delivery) is essentially a straight line. This is illustrated in FIGURE 2 in which values for F for a product having a specific gravity of .510 are plotted against delivery temperatures in degrees Fahrenheit. To correct for a pressure above vapor pressure utilizing these values for F, it is necessary to make an additional correction for compressibility from ambient pressure to equilibrium pressure at ambient temperature. This can be accomplished as illustrated in the following equation:

$$V_s = V_a \left[ \frac{F}{1 - f_p(P_a - P_e)} \right]$$

$F$ = correction factor to correct for thermal expansion and compressibility from equilibrium conditions at $t_a$ to equilibrium conditions at $t_s$
$P_e$ = vapor pressure at $t_a$ This type of correction still requires relatively complicated computation; however, to simplify this computation I have found that the term $f_p (P_a - P_e)$ can be reduced to a constant if the pressure under metering conditions is maintained at a fixed value above the vapor pressure at ambient temperature. The equation then becomes:

$$V_s = V_a(F/k)$$

$k = 1 - f_p$ times a constant pressure differential above the vapor pressure at ambient temperature In an equation of this form it is possible to make the entire correction with a positive displacement meter having temperature correction means.

In effect, this can be illustrated by adding a constant amount to the curve of FIGURE 2, as illustrated by the dashed line. A standard type of temperature-compensating positive displacement meter can be utilized to make the correction indicated by this curve.

Figure 3:
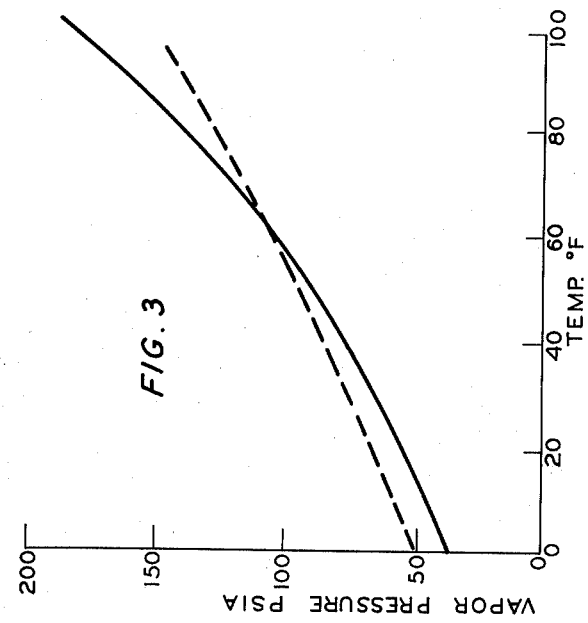
FIG. 3 is a graph plotting temperature versus vapor pressure for a typical product.

The correction to convert the temperature reading from temperature transmitter 20 to a vapor pressure value for adjusting the set point of controller 16 is made by relay 23 according to a curve similar to that illustrated in FIGURE 3. The values indicated in FIGURE 2 and FIGURE 3 are for a commercial propane. In actual practice the curves used are those for the particular product which is often not a pure component but rather a mixture of components. However, it is possible to operate for long periods of time without changing the settings since it has been found that assuming the typical mixture sold at a particular location or in a particular pipe line to be unchanging results in accurate metering over a period of time.

The variation from the curve for F, solid line in FIGURE 2, to the dashed line in FIGURE 2, which includes the correction for the differential pressure above equilibrium pressure at ambient conditions, is not precisely a constant. However, it has been found that, in most instances, the variation is less than the variation which can occur within the accuracy of the instrumentation used. However, if it is desired to eliminate this entirely, the vapor pressure curve used for the compensation by relay 23 can be modified slightly. This has the effect of the actual amount of material being metered being less than or more than that indicated and this amount can be calibrated to correct the error above noted. For example, with the product for which the curves were made, the correction would be of the nature indicated by the dashed line in FIGURE 3, although the actual values have been exaggerated somewhat to illustrate the principle.

In a typical installation, meter 13 can be a Smith W–50 positive displacement meter with automatic temperature compensation, made by A. O. Smith Corporation, Los Angeles, California. Valve 14 can be a Fisher Type 675A, normally-open valve, while valve 15 can be a Fisher Type 675AR, normally-closed valve, manufactured by the Fisher Governor Company, Marshaltown, Iowa. Temperature transmitter 20 is a Taylor Type 316RG114, while controller 16 is a Taylor Type 202RF138 indicating pressure controller with adjustable sensitivity, automatic reset and pneumatic set point, manufactured by Taylor Instrument Company, Rochester, New York. Relay 23 is a calculating relay, such as a Sorteberg Force Bridge, Type C, of the Minneapolis-Honeywell Regulator Company, Minneapolis, Minnesota. Although not illustrated in the drawing, Fisher split-range valve positioners can be utilized with valves 14 and 15 to provide more accurate results if desired. Preferably, there is a slight intermediate range of output pressures from controller 16 for which neither valve is operative. That is, there is a a small range of pressure for which both valves are completely open. This tends to eliminate hunting.

Reasonable variation and modification are possible within the scope of my invention which sets forth method and apparatus for metering a liquid and correcting the metered volume to standard conditions by maintaining the pressure a fixed amount above vapor pressure at the ambient temperature and utilizing a temperature compensating positive displacement meter.

I claim:
1. Flow metering means, comprising:
a flow meter;
fluid inlet means for said meter;
fluid outlet means for said meter;
inlet throttling means in said inlet means;
outlet throttling means in said outlet means;
means to measure the pressure in said flow metering means;
means to measure the temperature in said flow metering means;
means to activate said inlet throttling means responsive to said pressure when said pressure exceeds a set point value, and to actuate said outlet throttling means when said pressure falls below said set point value; and
means to adjust said set point value responsive to said temperature.

2. Flow metering means, comprising:
a flow meter;
an inlet conduit connected with said meter;
an outlet conduit connected with said meter;
an inlet flow control motor value in said inlet conduit;
an outlet flow control motor valve in said outlet conduit;
a pressure controller having means for adjusting a set point as a function of a control signal;
means for determining the pressure in said flow metering means and carrying a signal representative of said pressure to said controller;
means for determining the temperature in said flow metering means and carrying a signal representative of said temperature to said means for adjusting a set point;
means connecting the output signal of said controller with the motors of said inlet and outlet flow control values;

means associated with the motor of said inlet valve to cause said inlet valve to close when said pressure exceeds a predetermined value; and means associated with the motor of said outlet valve to cause said outlet valve to close when said pressure falls below a predetermined value.

3. Flow metering means, comprising:

a flow meter;

an inlet conduit connected with said meter;

an outlet conduit connected with said meter;

an inlet flow control motor valve in said inlet conduit;

an outlet flow control motor valve in said outlet conduit;

a pressure controller having means for adjusting a set point as a function of a control signal;

means for sensing the pressure in said flow metering means and carrying a signal representative of said pressure to said controller;

means for sensing the temperature in said flow metering means and producing a first signal proportional to said temperature;

relay means for modifying said first signal to produce a second signal proportional to the vapor pressure of the fluid being metered;

means for carrying said second signal to said means for adjusting a set point;

means connecting the output signal of said controller with the motors of said inlet and outlet flow control valves;

means associated with the motor of said inlet valve to cause said inlet valve to close when said pressure exceeds a predetermined value; and means associated with the motor of said outlet valve to cause said outlet valve to close when said pressure falls below a predetermined value.

References Cited by the Examiner

UNITED STATES PATENTS

| | | | |
|---|---|---|---|
| 2,100,978 | 11/1937 | Rheinlander | 73—199 |
| 2,402,355 | 6/1946 | Whaley | 73—199 X |
| 2,956,412 | 10/1960 | Loebeck | 62—49 |
| 2,970,473 | 2/1961 | Kendig | 73—199 X |
| 3,021,684 | 2/1962 | Berck | 73—199 X |
| 3,076,337 | 2/1963 | Gehre | 73—199 |

LOUIS R. PRINCE, *Primary Examiner.*

ROBERT L. EVANS, RICHARD QUEISSER,
*Examiners.*